（12）United States Patent
Tonouchi et al.

(10) Patent No.: US 10,832,100 B2
(45) Date of Patent: Nov. 10, 2020

(54) TARGET RECOGNITION DEVICE

(71) Applicant: KABUSHIKI KAISHA TOSHIBA, Minato-ku (JP)

(72) Inventors: Yojiro Tonouchi, Inagi (JP); Daisuke Kobayashi, Kawasaki (JP); Osamu Yamaguchi, Yokohama (JP); Hideo Umeki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 29 days.

(21) Appl. No.: 15/691,919

(22) Filed: Aug. 31, 2017

(65) Prior Publication Data
US 2018/0276505 A1    Sep. 27, 2018

(30) Foreign Application Priority Data
Mar. 22, 2017   (JP) .................. 2017-055352

(51) Int. Cl.
G06K 9/18      (2006.01)
G06K 9/68      (2006.01)
G06K 9/00      (2006.01)
G06K 9/32      (2006.01)

(52) U.S. Cl.
CPC ....... G06K 9/6821 (2013.01); G06K 9/00671 (2013.01); G06K 9/3233 (2013.01); G06K 9/3258 (2013.01); G06K 9/3266 (2013.01); G06K 2209/011 (2013.01); G06K 2209/013 (2013.01)

(58) Field of Classification Search
CPC combination set(s) only.
See application file for complete search history.

(56) References Cited

U.S. PATENT DOCUMENTS

| 5,887,086 A | 3/1999 | Tokano |
| 6,252,984 B1 * | 6/2001 | Haneda ............... G06K 9/033 382/181 |
| 7,216,116 B1 * | 5/2007 | Nilsson ............... G06F 16/248 |
| 8,761,513 B1 | 6/2014 | Rogowski et al. |

(Continued)

FOREIGN PATENT DOCUMENTS

| EP | 2 713 313 A2 | 4/2014 |
| JP | 5-282091 A | 10/1993 |

(Continued)

OTHER PUBLICATIONS

Messelodi, S., et al., "Scene text recognition and tracking to identify athletes in sport videos", Multimedia Tools and Applications, vol. 63 No. 2, 2013, pp. 521-545.

(Continued)

*Primary Examiner* — Guillermo M Rivera-Martinez
(74) *Attorney, Agent, or Firm* — Oblon, McClelland, Maier & Neustadt, L.L.P.

(57) ABSTRACT

According to one embodiment, an information processing device includes a storage device and a processor connected to the storage device. The processor is configured to perform a process for displaying an image and information related to a size of a recognition target, and recognize a recognition target from the image. The information related to the size of the recognition target includes visual information of the recognition target.

12 Claims, 9 Drawing Sheets

(56) References Cited

U.S. PATENT DOCUMENTS

| | | | |
|---|---|---|---|
| 2002/0076111 A1* | 6/2002 | Dance | G06K 9/6828 |
| | | | 382/229 |
| 2003/0012438 A1* | 1/2003 | Krtolica | G06K 9/00463 |
| | | | 382/173 |
| 2003/0044068 A1 | 3/2003 | Kagehiro et al. | |
| 2004/0141644 A1 | 7/2004 | Kurosawa | |
| 2005/0271296 A1* | 12/2005 | Tsuji | G06K 9/3283 |
| | | | 382/275 |
| 2006/0114484 A1* | 6/2006 | Kitora | G06K 9/2063 |
| | | | 358/1.13 |
| 2009/0225086 A1* | 9/2009 | Tomida | G06T 11/60 |
| | | | 345/472 |
| 2009/0303508 A1 | 12/2009 | Tanaka | |
| 2010/0114557 A1* | 5/2010 | Fuji | G06F 17/2836 |
| | | | 704/4 |
| 2010/0141758 A1* | 6/2010 | Kim | G06K 9/20 |
| | | | 348/135 |
| 2011/0090253 A1 | 4/2011 | Good | |
| 2011/0175917 A1* | 7/2011 | Honda | G06F 3/018 |
| | | | 345/468 |
| 2013/0039537 A1 | 2/2013 | Yamazaki et al. | |
| 2013/0326398 A1* | 12/2013 | Zuverink | G06F 3/048 |
| | | | 715/784 |
| 2014/0168478 A1* | 6/2014 | Baheti | G06K 9/3258 |
| | | | 348/240.99 |
| 2014/0297256 A1 | 10/2014 | Rogowski et al. | |
| 2015/0042562 A1* | 2/2015 | Kurzweil | G06K 9/42 |
| | | | 345/156 |
| 2015/0067484 A1* | 3/2015 | Sumio | G06F 3/04883 |
| | | | 715/251 |
| 2015/0154317 A1 | 6/2015 | Inoue | G10L 15/28 |
| | | | 711/108 |
| 2015/0215546 A1* | 7/2015 | Adachi | H04N 5/23296 |
| | | | 348/240.2 |
| 2015/0243060 A1* | 8/2015 | Yamazaki | G06T 3/40 |
| | | | 345/666 |
| 2015/0365625 A1* | 12/2015 | Ishizaki | H04N 21/4312 |
| | | | 348/581 |
| 2016/0004692 A1 | 1/2016 | Rogowski et al. | |
| 2016/0063340 A1 | 3/2016 | Suzuki et al. | |
| 2016/0092745 A1 | 3/2016 | Wada et al. | |
| 2018/0225536 A1 | 8/2018 | Tonouchi | |

FOREIGN PATENT DOCUMENTS

| | | | |
|---|---|---|---|
| JP | 7-288722 | A | 10/1995 |
| JP | 2000-23012 | A | 1/2000 |
| JP | 2000-207487 | A | 7/2000 |
| JP | 2001-357355 | A | 12/2001 |
| JP | 2003-78640 | A | 3/2003 |
| JP | 2004-140555 | A | 5/2004 |
| JP | 2004-341977 | A | 12/2004 |
| JP | 2005-18507 | A | 1/2005 |
| JP | 2006-331216 | A | 12/2006 |
| JP | 2007-266873 | A | 10/2007 |
| JP | 2009-296533 | A | 12/2009 |
| JP | 2010-102668 | A | 5/2010 |
| JP | 2012-222581 | A | 11/2012 |
| JP | 2013-122747 | A | 6/2013 |
| JP | 2014-228953 | A | 12/2014 |
| JP | 2016-45877 | A | 4/2016 |
| JP | 2016-76093 | A | 5/2016 |
| JP | 2016-519797 | A | 7/2016 |
| JP | 2018/124918 | A | 8/2018 |

OTHER PUBLICATIONS

Wang, W., et al., "Mobile Visual Text Translator", Jan. 1, 2016, Downloaded by the EPO on Jul. 4, 2018 from: https://www.semanticscholar.org/paper/Mobile-Visual-Text-Translator-Wang-Yan/5c0b4afae7c75c11915fe0c8488f67fea1e77034, pp. 1-5.

"Introducing Word Lens", youtube, Dec. 16, 2010, Downloaded by the EPO on Jul. 5, 2018 from: https://www.youtube.com/watch?v=h2OfQdYrHRs, 1 page.

"MIR Translator—App to Translate text captured by the Nokia N900 mobile cell phone camera", youtube, Apr. 12, 2011, Downloaded by the EPO on Jul. 4, 2018 from: https://www.youtube.com/watch?v=VT-XsUPXCFA, 1 page.

"PhotoTranslator for Nokia N900", youtube, Feb. 15, 2010, Downloaded by the EPO on Jul. 4, 2018 from: https://www.youtube.com/watch?v=adPdZzMlm3M, 1 page.

"Waygo for iPhone", youtube, Aug. 13, 2014, Downloaded by the EPO on Jul. 4, 2018 from: https://www.youtube.com/watch?v=drdH3iy0T7w, 1 page.

Barak Turovsky, "Hallo, hola, olá to the new , more powerful Google Translate App", retrieved from the internet: https://www.blog.google/products/translate/hallo-hola-ola-more-powerful-translate/ Jan. 14, 2015, pp. 1-5.

* cited by examiner

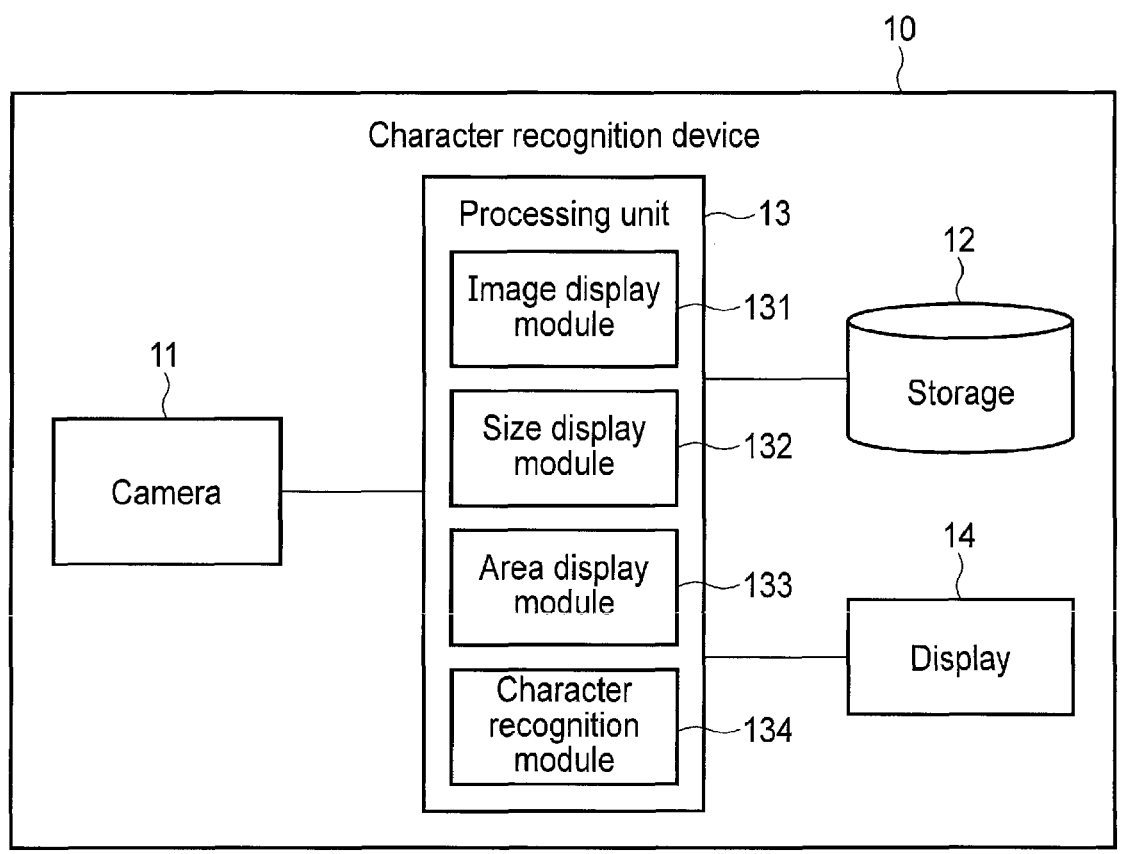
F I G. 1

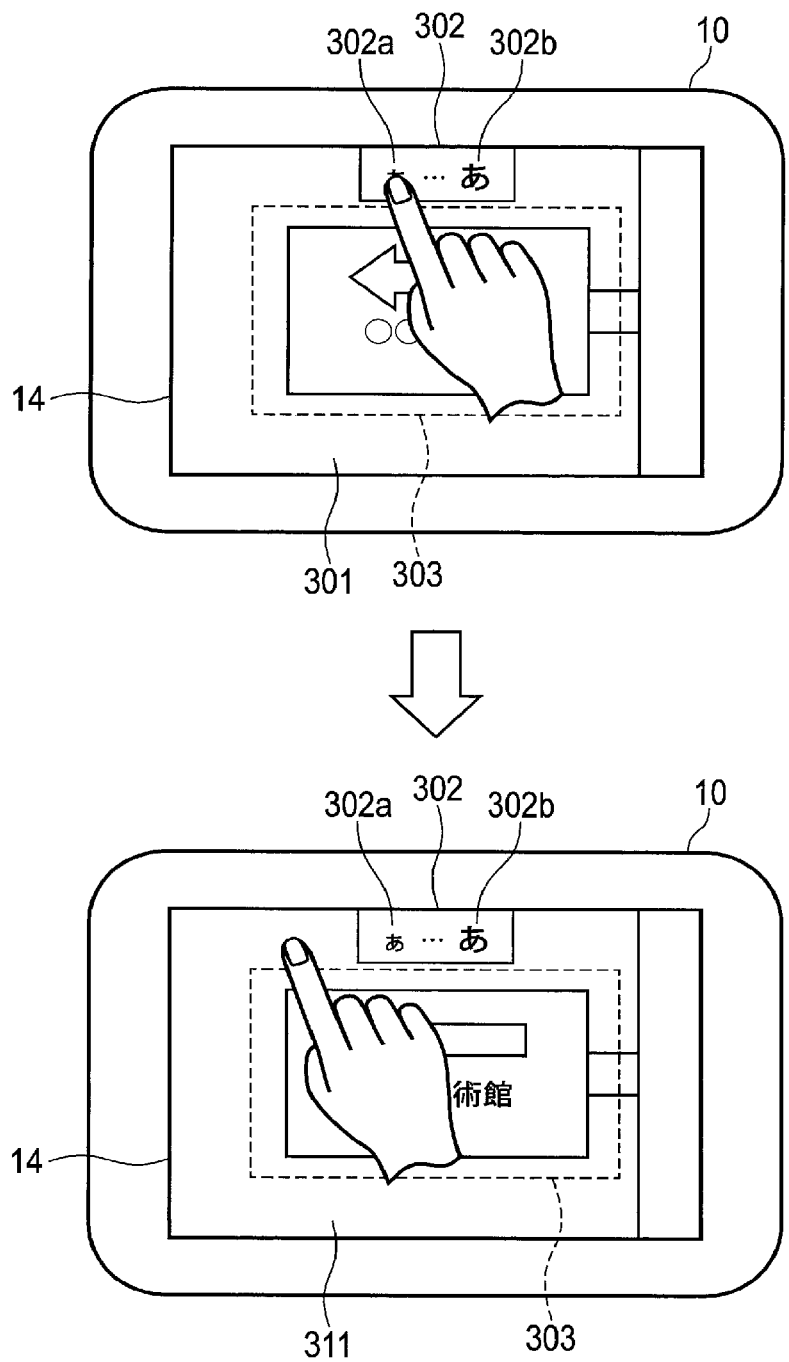
F I G. 5

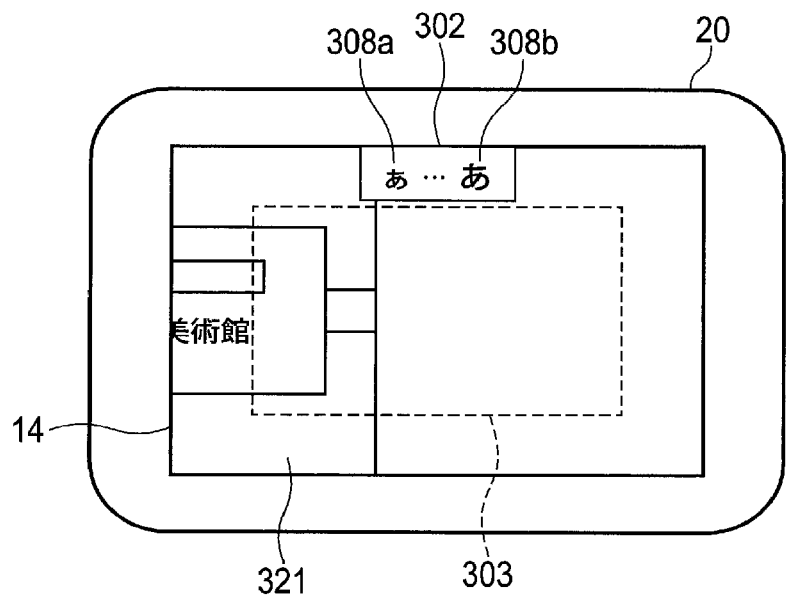
F I G. 14
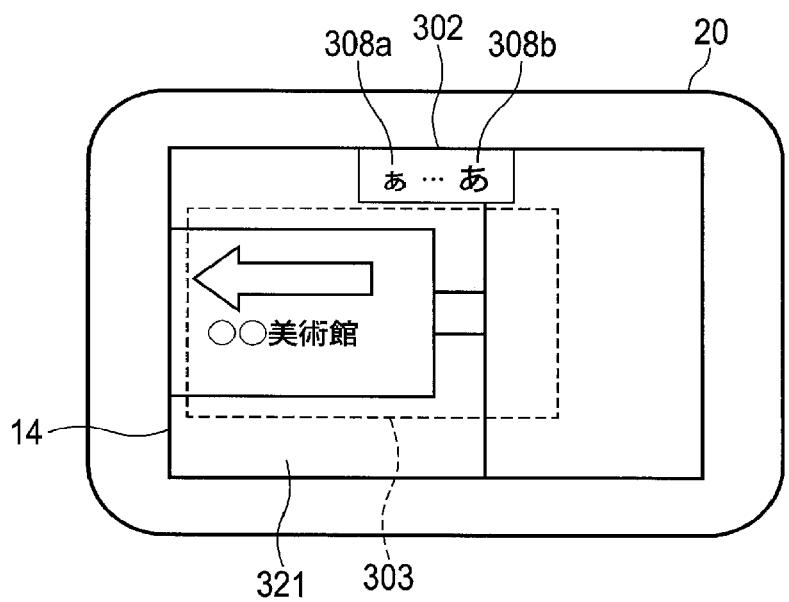
F I G. 15

TARGET RECOGNITION DEVICE

CROSS-REFERENCE TO RELATED APPLICATIONS

This application is based upon and claims the benefit of priority from Japanese Patent Application No. 2017-055352, filed Mar. 22, 2017, the entire contents of which are incorporated herein by reference.

FIELD

Embodiments described herein relate generally to an information processing device.

BACKGROUND

In recent years, for example, information processing devices capable of recognizing the specific object from an image have been developed. For example, the information processing devices include character recognition devices which capture an image of an object in which characters are written, and recognize the characters from the image.

The image may include various characters (the targets to be recognized). It may take a long processing time to recognize all the characters.

The processing time can be reduced by restricting, for example, the size of the characters to be recognized in character recognition devices.

However, the desired characters for the user may not be recognized from the image if the user does not know (the size of) the characters recognized in the character recognition device. Thus, the convenience of the character recognition device is reduced.

BRIEF DESCRIPTION OF THE DRAWINGS

FIG. 1 is a block diagram showing an example of the configuration of a character recognition device according to a first embodiment.

FIG. 5 is shown for explaining an example of a second size change operation.

FIG. 14 is shown for specifically explaining a third parameter change process.

FIG. 15 is shown for specifically explaining the third parameter change process.

DETAILED DESCRIPTION

Figure 2:
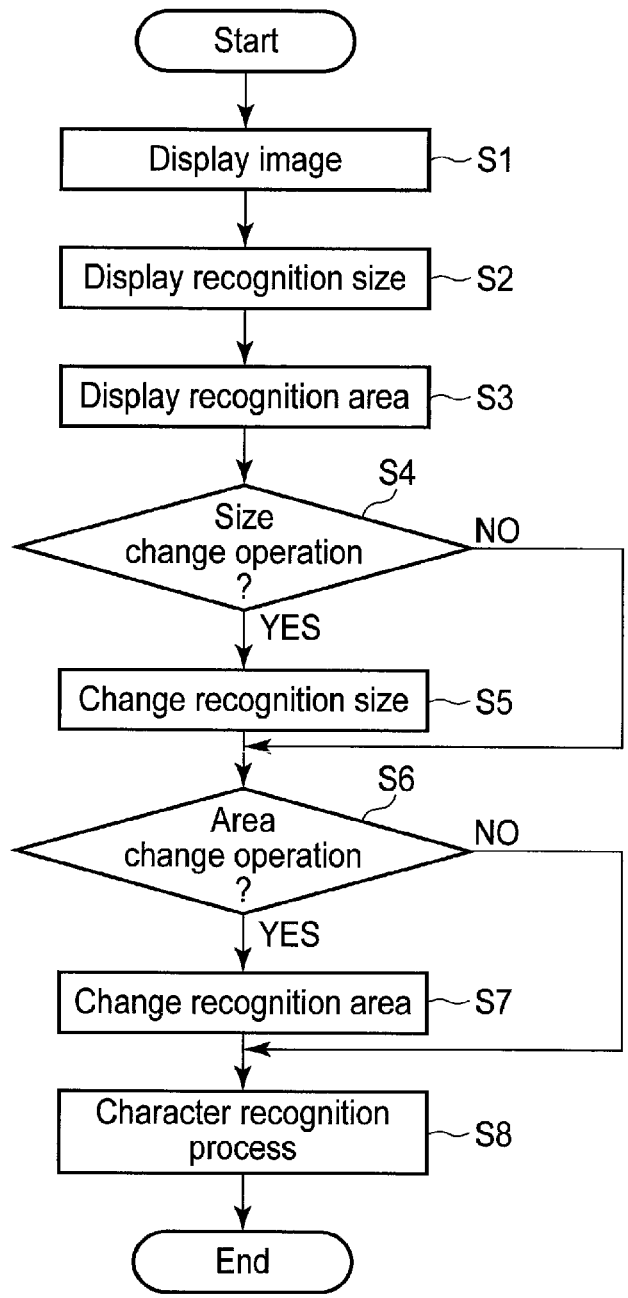
FIG. 2 is a flowchart showing an example of the procedure of the process of the character recognition device.

In general, according to one embodiment, an information processing device includes a storage device and a processor connected to the storage device. The processor is configured to perform a process for displaying an image and information related to a size of a recognition target, and recognize a recognition target from the image. The information related to the size of the recognition target includes visual information of the recognition target.

Various embodiments will be described hereinafter with reference to the accompanying drawings.

First Embodiment

FIG. 1 is a block diagram showing an example of the configuration of an information processing device according to a first embodiment. The information processing device of the present embodiment has a function for recognizing the target from an image, and may be realized as a portable electronic device such as a smartphone or a tablet computer. In the following description, this specification mainly explains an information processing device which recognizes characters as the targets to be recognized (hereinafter, referred to as a character recognition device). In the present embodiment, for example, the recognition of characters even includes the detection of characters.

As shown in FIG. 1, a character recognition device 10 includes a camera 11, a storage 12, a processing unit 13 and a display 14.

The camera 11 is mounted on the rear side, etc., of the character recognition device 10 such as a smartphone as described above, and captures an image of an object provided around the user holding the character recognition device 10. The object may be, for example, a notice on which characters (a string of characters) are written in a street. In the present embodiment, the camera 11 captures an image including a plurality of characters.

The storage 12 is realized by using a storage device a memory device provided in the character recognition device 10, such as a hard disk drive (HDD), a solid state drive (SSD), a read only memory (ROM) or a random access memory (RAM).

A configuration file in which parameters used to recognize characters from images captured by the camera 11 are set is stored in the storage 12. The parameters set in the configuration file include a size parameter (a first parameter) which is information related to the size of characters, and an area parameter (a second parameter) which is information related to the area of the image to be recognized (in other words, the area to be recognized). For example, the size of characters recognized from images (hereinafter, referred to as the recognition size) is defined in the size parameter. The area in which characters are recognized in each image (hereinafter, referred to as the recognition area) is defined in the area parameter.

The processing unit 13 is realized by a computer provided in the character recognition device 10 and executing programs stored in the storage device or the memory device. The processing unit 13 includes a processor and the like connected to the storage device and the memory device. The programs executed by a computer include, for example, an operating system and an application program for recognizing characters from images (hereinafter, referred to as a character recognition application).

The processing unit 13 is a function module which mainly performs a process for displaying an image and information related to the size of characters (the targets to be recognized). The processing unit 13 includes an image display module 131, a size display module 132, an area display module 133 and a character recognition module 134. The modules 131 to 134 included in the processing unit 13 are partially or entirely realized by, for example, causing the computer to perform the above character recognition application, in other words, by software. The modules 131 to 134 may be partially or entirely realized by hardware such as an integrated circuit (IC) or by combining software and hardware. The character recognition application executed by a computer may be stored in a computer-readable memory medium and distributed, or may be downloaded into the character recognition device 10 through a network.

The image display module 131 obtains an image captured by the camera 11. The image captured by the camera 11 may be stored in the storage 11. In this case, the image display module 131 is capable of obtaining an image from the storage 11. The image display module 131 may obtain an image from, for example, a server device provided outside the character recognition device 10. The image display module 131 displays the obtained image on the display 14.

The size display module 132 displays information which allows the user to visually confirm the recognition size defined in the size parameter (in other words, the visual information of the target to be recognized) on the image displayed by the image display module 131. In this case, the size display module 132 displays characters having the recognition size (in other words, characters having substantially the same size as the recognition size). In the present embodiment, the size parameter (information related to characters) includes information related to the shape of characters (in other words, the visual information of the characters to be displayed). The size display module 132 obtains information related to change in the recognition size and changes the size parameter in accordance with the operation of the user for the character recognition device 10.

The area display module 133 displays the recognition area defined in the area parameter on the image displayed by the image display module 131. The area display module 133 obtains information related to change in the recognition area and changes the area parameter in accordance with the operation of the user for the character recognition device 10.

The character recognition module 134 recognizes characters from an image displayed by the image display module 131 (an image captured by the camera 11) in accordance with the parameters (specifically, the size parameter and area parameter) set in the configuration file. When the size parameter or area parameter has been changed, the character recognition module 134 recognizes characters in accordance with the changed size parameter or area parameter (in other words, based on the information related to the change in the recognition size or recognition area).

The display 14 is realized by using, for example, a display device such as a touchpanel display provided in the character recognition device 10.

For example, a capacitive touchpanel capable of detecting a contact position on the screen of the touchpanel display with a finger (or a stylus) is incorporated into the touchpanel display. In this way, the user is allowed to conduct operation for the character recognition device 10 by bringing his/her finger into contact with (in other words, by touching) the screen of the touchpanel display.

Now, this specification explains an example of the procedure of the process of the character recognition device 10 according to the present embodiment with reference to the flowchart of FIG. 2.

For example, the process shown in FIG. 2 is performed by the processing unit 13 when the character recognition application is activated on the character recognition device 10.

When the character recognition application is activated on the character recognition device 10, the image display module 131 obtains an image captured by the camera 11. When the character recognition device 10 is a smartphone, etc., as described above, a button (for example, a shutter button) used by the user to instruct the camera 11 to capture an image is assumed to be provided in the character recognition device 10. In this case, the image display module 131 obtains a still image captured by the camera 11 when the user presses the shutter button. The image display module 131 displays the obtained image on the display 14 (step S1).

Subsequently, the size display module 132 refers to the configuration file stored in the storage 12 and obtains the size parameter from the parameters set in the configuration file. In the size parameter obtained by the size display module 132, the minimum value (a first size) and the maximum value (a second size) of the recognition size are defined (specified). That is, in the size parameter, the range of the recognition size (from the minimum value to the maximum value) is defined. The size parameter indicates that characters having a size applied to the range from the minimum value to the maximum value are recognized from images.

The size display module 132 displays characters having the recognition size defined in the obtained size parameter on the image displayed on the display 14 in step S1 (step S2).

Subsequently, the area display module 133 refers to the configuration file stored in the storage 12 and obtains the area parameter from the parameters set in the configuration file. In the area parameter obtained by the area display module 133, the position and size of the recognition area are defined (specified) by, for example, coordinates on an image. Specifically, in the area parameter, for example, the maximum and minimum values of the x-coordinate and the maximum and minimum values of the y-coordinate on an image are defined. When the number of pixels inside the polygon (recognition area) in an image is N, the coordinates of the N points may be defined as the area parameter. The area parameter may be defined such that the area in which the pixel value is not zero is the recognition area.

The area display module 133 displays the recognition area defined in the obtained area parameter on the image displayed on the display 14 in step S1 (step S3).

Figure 3:
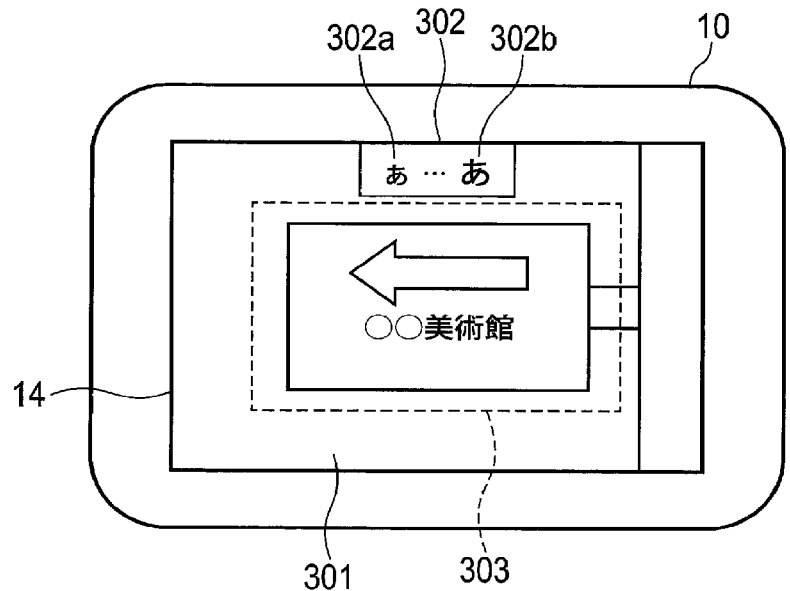
FIG. 3 shows an example of an image displayed on a display.

Now, this specification explains an example of the image displayed on the display 14 with reference to FIG. 3. In the example of FIG. 3, an image 301 including a notice provided in a street and including the characters (string) "○○ 美術館" (in Japanese) is displayed on the display 14.

A size display area 302 is provided on image 301. The size display area 302 is an area for displaying the recognition size (the size of the characters recognized from the image) defined in the size parameter. Specifically, a small character 302a and a large character 302b are displayed in the size display area 302.

In the size parameter, the minimum and maximum values of the recognition size are defined. Character 302a displayed in the size display area 302 indicates a character having a size corresponding to the minimum value defined in the size parameter (in other words, the smallest recognizable character). Character 302b displayed in the size display area 302 indicates a character having a size corresponding to the maximum value defined in the size parameter (in other words, the largest recognizable character).

The user is able to confirm that characters in the range from the size of character 302a to the size of character 302b are recognizable in accordance with the size parameter with reference to the size display area 302 (specifically, with reference to characters 302a and 302b displayed in the size display area 302).

In the example shown in FIG. 3, two characters, specifically, characters 302a and 302b, are displayed in the size display area 302. However, three or more characters may be displayed in the size display area 302. In this case, for example, a character having a size corresponding to an intermediate value between the minimum and maximum values of the recognition size defined in the size parameter may be displayed in addition to characters 302a and 302b.

The recognition area defined in the area parameter (in other words, the area in which characters are recognized in the image) is displayed on image 301. In the example shown in FIG. 3, the recognition area defined in the area parameter is indicated with a rectangular frame 303. In this way, the user is able to recognize that the characters (string) in the area indicated with the rectangular frame 303 (hereinafter, referred to as in the recognition area 303) are recognizable. For example, it is assumed that the recognition area 303 is defined so as to be located in the center of image 301 in the area parameter. Similarly, it is assumed that the length, etc., of each side of the recognition area 303 is defined in the area parameter.

In the example shown in FIG. 3, each character of the string "○○美術館" written on the notice included in image 301 is larger than character 302a and smaller than character 302b. The character string "○○美術館" is included in the recognition area 303. In this case, the character string "○○美術館" included in image 301 is (in other words, the characters of the string "○○ 美 術館" are) recognizable from image 301 by the character recognition process described later.

Figure 4:
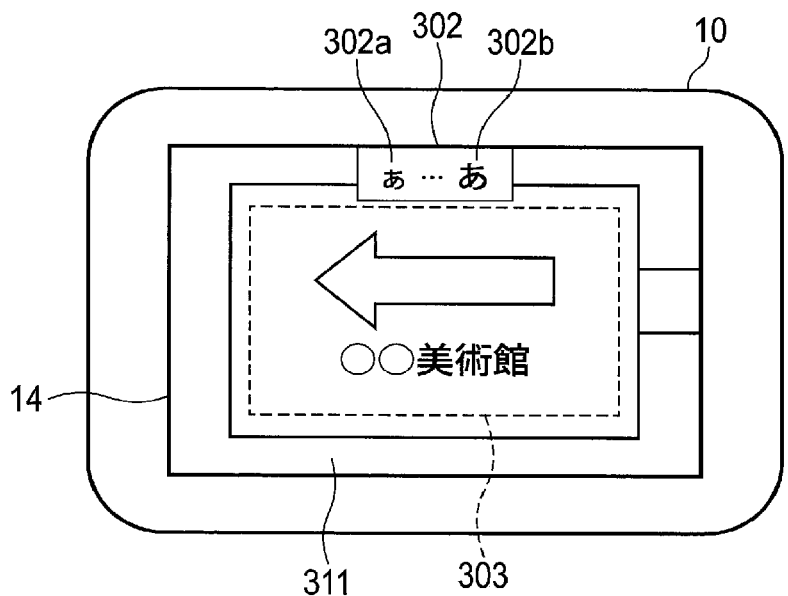
FIG. 4 shows an example in which no character is recognized from an image.

Although the characters are recognizable in the above example, the character string "○○美術館" is (specifically, the characters of the string "○○ 美術館" are) not recognized from image 311 when the characters included in an image 311 are larger than character 302b as shown in FIG. 4.

In this case, the user is able to change the recognition size (specifically, the range of the recognition size) defined in the size parameter by operating the character recognition device 10 to cause the character recognition device 10 to recognize the character string "○○美術館" included in image 311 shown in FIG. 4.

Now, this specification explains an example of operation when the user changes the range of the recognition size defined in the size parameter (hereinafter, referred to as a size change operation). It is assumed that the character recognition device 10 includes a touchpanel display, and the size change operation is applied with respect to the touchpanel display.

This specification explains first to third size change operations. In the first size change operation, for example, character 302a or character 302b displayed in the size display area 302 is touched. According to the first size change operation, the minimum or maximum value of the recognition size defined in the size parameter is changed by one step every time the first size change operation is performed.

Specifically, when character 302a displayed in the size display area 302 is touched once, the minimum value of the recognition size can be increased by one step. In this case, the size of character 302a displayed in the size display area 302 is changed to a size corresponding to the changed minimum value.

When character 302b displayed in the size display area 302 is touched once, the maximum value of the recognition size can be increased by one step. In this case, the size of character 302b displayed in the size display area 302 is changed to a size corresponding to the changed maximum value.

In the above explanation, the minimum or maximum value of the recognition size is increased. On the other hand, when the minimum or maximum value is decreased, the user performs the first size change operation different from that when the minimum or maximum value is increased. The first size change operation performed when the minimum or maximum value of the recognition size is decreased includes, for example, an operation for successively touching character 302a or character 302b displayed in the size display area 302 twice or an operation for touching character 302a or character 302b long.

In the second size change operation, for example, character 302a or character 302b displayed in the size display area 302 is slid. According to the second size change operation, the minimum or maximum value of the recognition size defined in the size parameter is changed based on the distance in which the character is slid by the second size change operation.

Specifically, as shown in FIG. 5, when character 302a displayed in the size display area 302 is slid to the left in a state where character 302a is touched, the minimum value of the recognition size can be decreased. Although not shown in the figure, when character 302a displayed in the size display area 302 is slid to the right in a state where character 302a is touched, the minimum value of the recognition size can be increased. When the minimum value of the recognition size is changed, the size of character 302a displayed in the size display area 302 is changed to a size corresponding to the changed minimum value.

Similarly, when character 302b displayed in the size display area 302 is slid to the left in a state where character 302b is touched, the maximum value of the recognition size can be decreased. When character 302b displayed in the size display area 302 is slid to the right in a state where character 302b is touched, the maximum value of the recognition size can be increased. When the maximum value of the recognition size is changed, the size of character 302b displayed in the size display area 302 is changed to a size corresponding to the changed maximum value.

In the third size change operation, for example, the minimum and maximum values of the recognition size defined in the size parameter are directly specified (selected).

Figure 6:
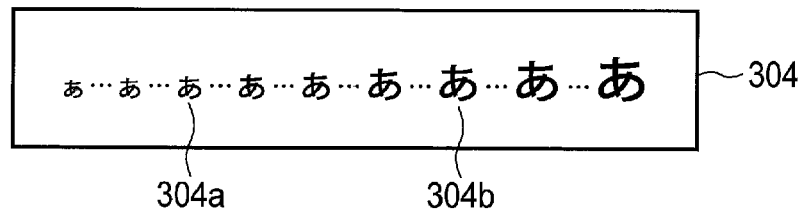
FIG. 6 shows an example of a size specifying area.

Specifically, for example, when the size display area 302 (specifically, character 302a or character 302b displayed in the size display area 302) is touched, a size specifying area 304 is displayed on the display 14 as shown in FIG. 6. In the size specifying area 304, the user is able to touch the minimum value (specifically, a character having a size corresponding to the minimum value) and the maximum value (specifically, a character having a size corresponding to the maximum value) of the recognition size.

In the example shown in FIG. 6, for example, the user is able to touch character 304a as a character having a size corresponding to the minimum value of the recognition size, and touch character 304b as a character having a size corresponding to the maximum value of the recognition size defined in the size parameter. In this manner, the minimum and maximum values of the recognition size (in other words, sizes corresponding to characters 302a and 302b) can be changed to minimum and maximum values corresponding to the sizes of characters 304a and 304b touched by the user, respectively. When the minimum and maximum values of the recognition size are changed, characters 304a and 304b are displayed in the size display area 302.

According to the first to third size change operations, when image 311 shown in FIG. 4 is displayed, the maximum value of the recognition size can be changed such that character 302b displayed in the size display area 302 is larger than the characters "○○美術館". In this way, the characters "○○美術館" included image 311 can be recognized from image 311.

In the above descriptions, the first to third size change operations are explained. However, the recognition size defined in the size parameter may be changed by other operations such as an operation with respect to a slide bar displayed on the image.

Figure 7:
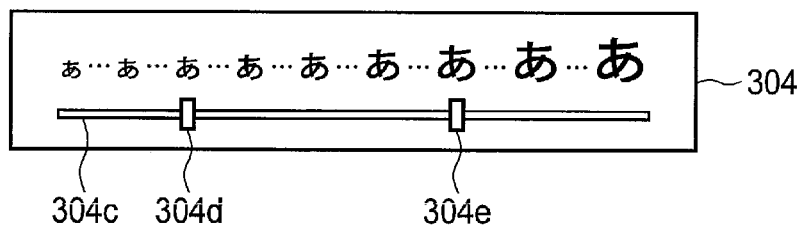
FIG. 7 is shown for explaining a case where the recognition size is changed with a slide bar.

Now, this specification explains a case where the recognition size defined in the size parameter is changed by an operation with respect to a slide bar with reference to FIG. 7. As described above, when the size display area 302 is touched, the size specifying area 304 is displayed on the display 14. In this case, characters having different sizes are arranged in order based on the size in the size specifying area 304. A slide bar 304c is provided along the arrangement of the characters. A slider 304d corresponding to the minimum value of the recognition size and a slider 304e corresponding to the maximum value of the recognition size are provided on the slide bar 304c. The user is able to change the minimum and maximum values of the recognition size by sliding sliders 304d and 304e to the right and left.

Figure 8:
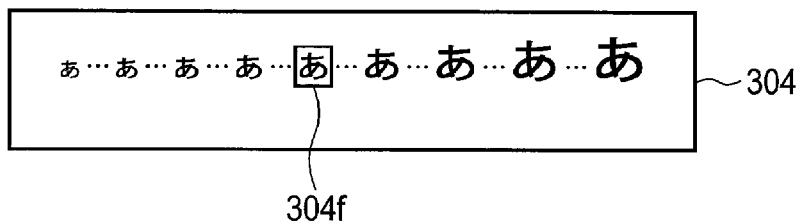
FIG. 8 is shown for explaining a case where the recognition size is changed with a cursor.

In the above explanation, the range of the recognition size from the minimum value to the maximum value is changed. For example, (a character of) a single size may be selected by moving a cursor 304f in the size specifying area 304 as shown in FIG. 8. In this case, for example, the recognition size may be changed such that only characters having the selected size are recognized. Alternatively, the recognition size may be changed such that the characters having the sizes in a predetermined range including the selected size are recognized. When a single size is selected as shown in FIG. 8, for example, a single character having the size may be displayed in the size display area 302.

Returning to FIG. 2, the size display module 132 determines whether or not a size change operation is performed by the user (step S4).

When the size display module 132 determines that a size change operation is performed by the user (YES in step S4), the size display module 132 performs a process for changing the range (the minimum or maximum value) of the recognition size defined in the size parameter as described above (step S5). When the range of the recognition size is changed in step S5, the size display module 132 updates the display of the size display area 302 (specifically, the characters displayed in the size display area 302) based on the changed range of the recognition size.

When the size display module 132 determines that no size change operation is performed by the user (NO in step S4), the process of step S5 is not performed.

As described above, the user is able to change (the range of) the recognition size defined in the size parameter by performing a size change operation. However, the user may also change (the range of) the recognition area defined in the area parameter by operating the character recognition device 10.

Specifically, the user is able to move (change) the position of the recognition area displayed on the display 14 by, for example, sliding the recognition area up or down or to the right or left in a state where the inside of the recognition area is touched.

The user may change the size of the recognition area displayed on the display 14 by, for example, moving two fingers together or apart in a state where two points on the frame indicating the recognition area are touched with the two fingers.

When the position or size of the recognition area is changed as described above, the recognition area is displayed on the display 14 based on the changed position or size.

In the following explanation, the operation performed by the user to change the position or size of the recognition area defined in the area parameter is called an area change operation for the sake of convenience.

In this case, the area display module 133 determines whether or not an area change operation is performed by the user (step S6).

When the area display module 133 determines that an area change operation is performed by the user (YES in step S6), the area display module 133 performs a process for chancing the position and size of the recognition area defined in the area parameter as described above (step S7). When the position and size of the recognition area are changed in step S7, the area display module 133 updates the display of the recognition area 303 based on the changed position and size of the recognition area.

When the area display module 133 determines that no area change operation is performed by the user (NO in step S6), the process of step S7 is not performed.

Subsequently, the character recognition module 134 performs a process for recognizing the characters (string) included in the image displayed in step S1 (hereinafter, referred to as a character recognition process) based on the recognition size defined in the size parameter and the recognition area defined in the area parameter (step S8). A known technology may be used for the method for recognizing characters. For example, the technology disclosed in JP 2016-045877 A may be used.

In the character recognition process, the area including characters is detected from the image displayed in step S1. In this case, the area including, from the characters included in the image, characters applicable to the range of the recognition size defined in the size parameter (from the minimum value to the maximum value) and present in the recognition area defined in the area parameter (hereinafter, referred to as a character area) is detected.

Subsequently, the character recognition module 134 performs character recognition for the detected character area. The character recognition module 134 obtains text indicating a character string including the characters included in the character area as a result of character recognition.

For example, the text obtained by the character recognition module 134 as described above may be translated into a predetermined language by a language analysis process and displayed on the display 14.

It is assumed that the text obtained by the character recognition module 134 as described above is the Japanese language, and the text is translated into the English language and displayed on the display 14. In this case, the characters detected from the image (in other words, the characters before translation) are the characters used in the Japanese language. Thus, the characters used in the Japanese language are used for the character of the recognition size displayed on the image (specifically, for characters 302a and 302b shown in FIG. 3 and FIG. 4). In this manner, the user is able to easily determine whether or not the characters detected from the image (the characters included in the image) are applicable to the range of the recognition size displayed on the image (that is, whether or not the characters in the image are recognizable). The languages before and after translation are set by the user in advance as the operation mode of the character recognition device 10 (for example, a Japanese-English mode). The language of the character of the recognition size is determined in accordance with the operation mode. When the language before translation is the English language, and the language after translation is the Japanese language (in other words, when the operation mode is an English-Japanese mode), an alphabetical letter (for example, "A") can be used as the character of the recognition size.

When the type (for example, the font) of each character detected from the image is determined, a character corresponding to the type may be displayed on the image. When the characters detected from the image are handwritten, a handwritten character may be displayed on the image as the character of the recognition size.

As described above, in the present embodiment, information related to the size of characters includes information related to the shape of characters (for example, the type of the character of the recognition size displayed on the image). The information related to the shape of characters may be determined in accordance with the operation mode.

In the above description, the text obtained by the character recognition module 134 is translated. However, other processes may be performed for the text as long as information useful for the user is presented.

Further, although the image obtained in step S1 is explained as a still image in the present embodiment, the image may be a moving image, or may be one of the images constituting a moving image.

In FIG. 2, the recognition area is (specifically, the position and size of the recognition area are) changed after the recognition size (specifically, the range of the recognition size) is changed. However, the recognition size may be changed after the recognition area is changed.

As described above, in the present embodiment, the characters having the recognition size defined in the size parameter (first parameter) (in other words, the sizes of the characters to be recognized from an image) are displayed on an image. From the characters included in the image, the characters having the sizes defined in the size parameter are recognized from the image.

In the present embodiment, by such a configuration, the characters recognized from an image are restricted to the characters applicable to the recognition size defined in the size parameter and therefore the processing speed of the character recognition process can be increased. Further, the recognition size (specifically, the range of the recognition size) can be presented to the user. Thus, the user is able to easily recognize the sizes of the characters to be recognized from an image.

In the present embodiment, since the characters having the recognition size defined in the size parameter are displayed, the user is able to intuitively recognize the recognition size.

Further, in the present embodiment, when the size of a character included in an image is not applicable to the recognition size, and thus, the desired character for the user is not recognized, the range of the recognition size may be changed in accordance with the operation of the user.

In the present embodiment, the range of the size of characters recognized from an image is changed by changing the minimum or maximum value of the recognition size defined in the size parameter as described above. However, the user may specify a character included in an image (in other words, a character displayed on the display 14). In this case, the size parameter may be changed such that a character having substantially the same size as the character specified by the user is detected. Alternatively, the user may specify a character included in an image, and the size parameter may be changed such that a character having substantially the same size as the character specified by the user is not detected.

In the present embodiment, the recognition area defined in the area parameter (second parameter) (in other words, the area in which characters are recognized in an image) is displayed on an image and the characters in the recognition area are recognized. In the present embodiment, by such a configuration, the area in which characters are recognized is restricted to a part of an image and therefore the processing speed of the character recognition process can be increased. Further, the user is able to easily recognize the area in which characters are recognized in an image.

In the present embodiment, the characters included in the areas of an image other than the recognition area defined in the area parameter are not recognized. However, the present embodiment may be configured such that the characters included in the recognition area are preferentially recognized. In this case, when characters are included in the recognition area (in other words, when the characters included in the recognition area are recognized), a process for recognizing the characters included in the areas other than the recognition area may not be performed. When no character is included in the recognition area, a process for recognizing the characters included in the areas other than the recognition area may be performed. Even in this structure, when characters are recognized from the recognition area, a process for recognizing characters from the areas other than the recognition area is not performed. Thus, the processing speed of the character recognition process can be increased.

Moreover, the recognition area defined in the area parameter may be the entire area of an image. When characters are recognized from the entire area of an image, and thus, there is no need to change the area for recognizing characters (the recognition area), the area parameter may not be set in the configuration file.

In the present embodiment, the position of the size display area (specifically, the position of the characters having the recognition size defined in the size parameter) on an image may be set to the vicinity of the recognition area as shown in, for example, FIG. 3 and FIG. 4. In this way, the characters included in the recognition area can be appropriately compared with the characters having the recognition size (in other words, the range of the recognition size).

When the position and size of the recognition area are changed as described above, the position of the size display area may be changed in accordance with the changed position and size of the recognition area.

The size display area may be displayed in an area presumably including no character by, for example, an image process. When the user specifies a position, the size display area may be displayed at the position specified by the user. The size display area may not be displayed when the characters included in an image are recognized.

In the present embodiment, for example, an image including a notice provided in a street is captured by the camera 11. However, the object captured by the camera 11 may be, for example, a guide board, a menu, the tag of a product or a book as long as characters are written. The object captured by the camera 11 may be, for example, a display on which characters are written.

In the present embodiment, the character recognition device which recognizes characters from images is explained. However, the present embodiment may be applied when the target other than characters is recognized from an image. Specifically, the present embodiment may be applied to an information processing device (recognition device) which recognizes faces, people, symbols, signs, other objects, etc., from images. The object to be recognized may be a mobile object such as a car. A known technology using statistical learning, etc., may be used for the recognition of these objects. For example, when faces are detected, the pictures or illustrations of large and small faces having different sizes may be displayed on a display, etc., as the visual information of faces.

Second Embodiment

Figure 9:
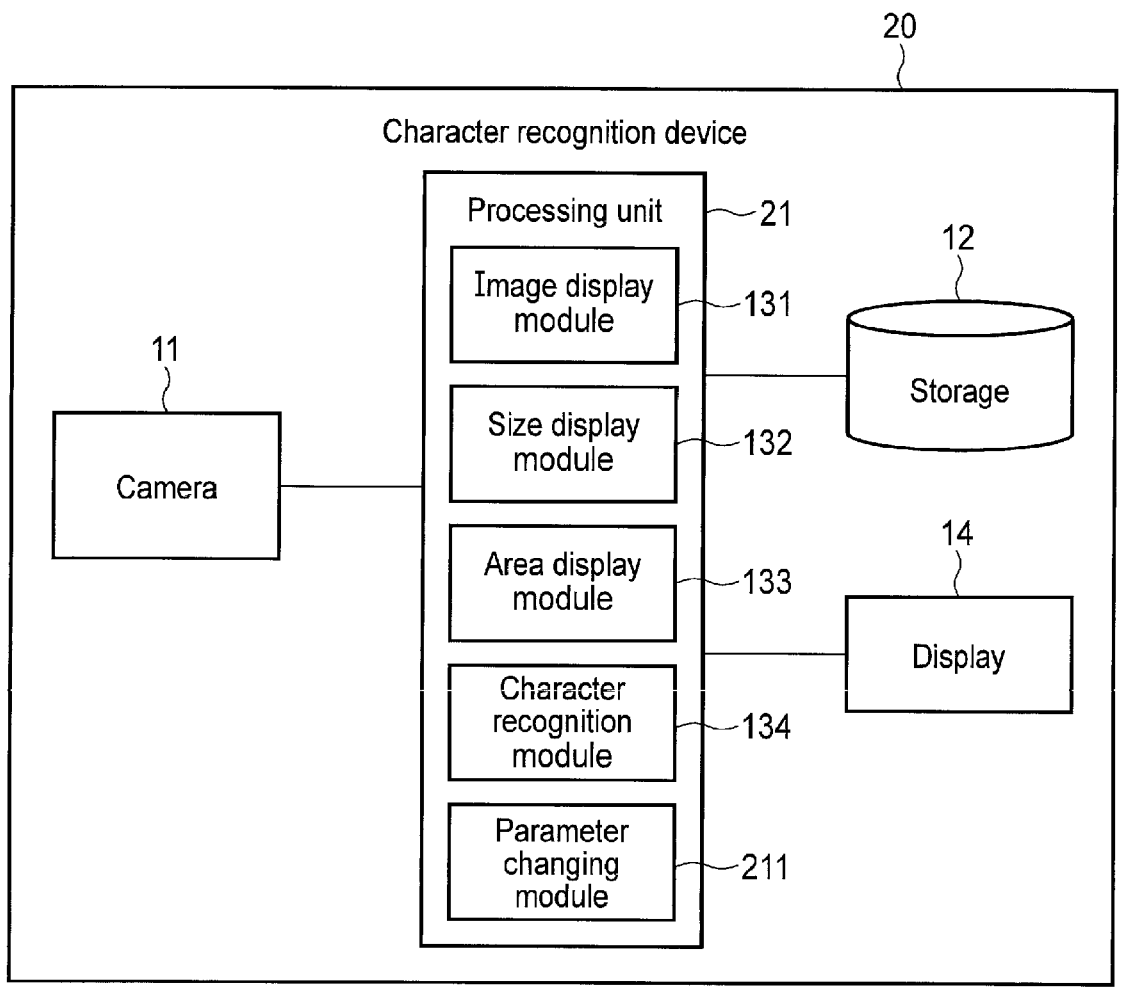
FIG. 9 is a block diagram showing an example of the configuration of a character recognition device according to a second embodiment.

Now, this specification explains a second embodiment. FIG. 9 is a block diagram showing an example of the configuration of a character recognition device (information processing device) according to the present embodiment. In FIG. 9, the same structures as FIG. 1 are denoted by the same reference numbers, detailed description thereof being omitted. Here, structures different from those of FIG. 1 are mainly explained.

The character recognition device of the present embodiment is different from that of the first embodiment in respect that the parameters set in a configuration file are automatically adjusted.

As shown in FIG. 9, a character recognition device 20 includes a processing unit 21. The processing unit 21 is realized by a computer provided in the character recognition device 20 and executing programs stored in a storage device or a memory device. The processing unit 21 includes a processor and the like connected to the storage device and a memory device. The programs executed by a computer include an operating system, a character recognition application, etc.

The processing unit 21 includes a parameter changing module 211. The parameter changing module 211 is realized by, for example, causing a computer to execute a character recognition application, in other words, by software. The parameter changing module 211 may be realized by hardware such as an IC, or by combining software and hardware.

For example, the parameter changing module 211 obtains information related to the change in the recognition size or recognition area and changes the parameters (specifically, a size parameter and an area parameter) set in the configuration file, based on the result of character recognition process by a character recognition module 134. The details of the process performed by the parameter changing module 211 for changing the parameters are described later.

Figure 10:
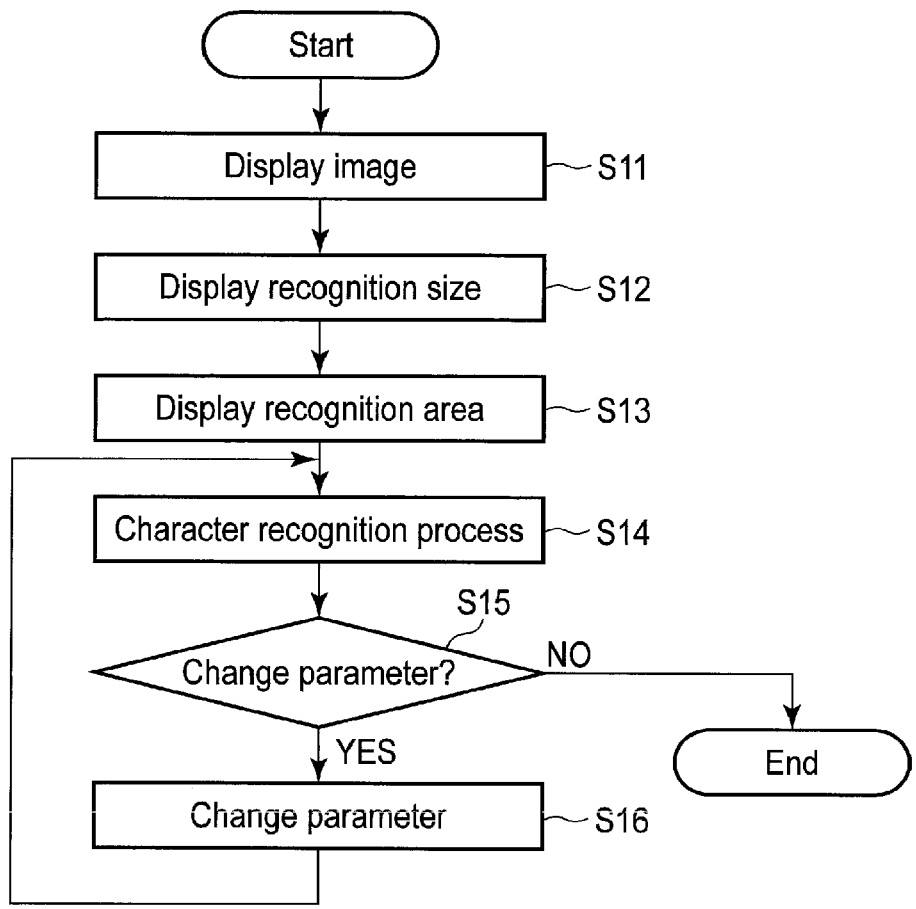
FIG. 10 is a flowchart showing an example of the procedure of the process of the character recognition device.

Now, this specification explains an example of the procedure of the process of the character recognition device 20 of the present embodiment with reference to the flowchart of FIG. 10.

The process shown in FIG. 10 is performed by the processing unit 21 when, for example, the character recognition application is activated on the character recognition device 20.

The processes of steps S11 to S13 corresponding to the processes of steps S1 to S3 shown in FIG. 2 are performed.

Subsequently, the process of step S14 corresponding to the process of step S8 shown in FIG. 2 is performed. Although the processes of steps S4 to S7 shown in FIG. 2 are omitted in FIG. 10, in the present embodiment, processes corresponding to the processes of steps S4 to S7 may be performed.

When the process of step S14 is performed, the parameter changing module 211 determines whether or not there is a need to change a parameter set in the configuration file based on the result of character recognition process in step S14 (step S15).

When the parameter changing module 211 determines that there is a need to change a parameter (YES in step S15), the parameter changing module 211 performs a process for changing the parameter (step S16). When the parameter is changed in step S16, the process returns to step S14 and repeats the steps.

When the parameter changing module 211 determines that there is no need to change a parameter (NO in step S16), the process shown in FIG. 10 is terminated.

Now, this specification explains the process of step S16 shown in FIG. 10 (hereinafter, referred to as a parameter change process) in detail. Here, first to third parameter change processes are explained.

The first parameter change process is explained. When the image obtained in step S11 as described above is, for example, a still image captured by the user by pressing a shutter button with a camera 11, it is presumed that the image includes the characters (string) to be recognized for the user. Thus, when no character is recognized from the image in the character recognition process, the parameter should be adjusted such that characters are recognized from the image.

For example, the first parameter change process is performed when no character is recognized in the process of step S14 (the character recognition process) (in other words, when the characters applicable to the range of the recognition size defined in the size parameter are not present in the recognition area defined in the area parameter). Specifically, when no character is recognized in the process of step S14, the parameter changing module 211 determines that there is a need to change a parameter in step S15 and the first parameter change process is performed in step S16.

In this case, for example, there is a possibility that the desired characters for the user are not recognized since the range of the recognition size defined in the size parameter from the minimum to the maximum values is narrow. In the first parameter change process, the parameter changing module 211 changes the size parameter such that, for example, the range of the recognition size defined in the size parameter is expanded. Specifically, for example, the parameter changing module 211 decreases the minimum value of the recognition size defined in the size parameter and increases the maximum value of the recognition size.

Figure 11:
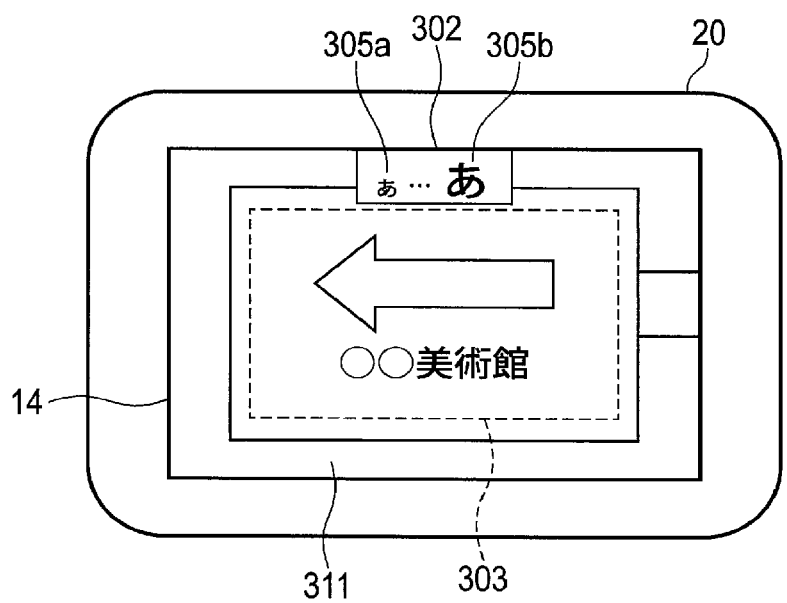
FIG. 11 is shown for specifically explaining a first parameter change process.

For example, when the character string "〇〇 美術館" is (in other words, the characters of the string "〇〇 美 術館 " are) not recognized from an image 311 as explained in FIG. 4, the range of the recognition size is expanded as shown (characters 305a and 305b displayed) in a size display area 302 in FIG. 11. In this way, the character string "〇〇美術館 " is made recognizable from image 311.

Only one of the minimum and maximum values of the recognition size defined in the size parameter may be changed.

Although this specification explains a case where the range of the recognition size is changed in the above description, there is a possibility that the desired characters for the user are not recognized since the recognition area defined in the area parameter is small. Thus, in the first parameter change process, for example, the parameter changing module 211 may change the area parameter so as to expand the recognition area defined in the area parameter.

According to the first parameter change process, it is possible to recognize the desired characters for the user by expanding the range in which characters are recognized from an image in the character recognition process performed after the first parameter change process.

Now, this specification explains the second parameter change process. The second parameter change process is performed when characters are recognized in the process of step S14 (the character recognition process) in a manner different from that of the first parameter change process.

In a situation where a large number of notices are provided in streets, it is presumed that the user causes the device to recognize the characters written in various notices. In many causes, it is presumed that the user captures notices such that the characters described in the notices have substantially the same size. When a process for recognizing characters having sizes in a wide range is performed in this case, an unintended character for the user may be recognized depending on the captured image. Thus, the processing speed is decreased.

When characters are recognized in the process of step S14, and further when, for example, the range of the recognition size defined in the size parameter is comparatively wide, the parameter changing module 211 determines that there is a need to change a parameter in step S15 and the second parameter change process is performed in step S16.

In the second parameter change process, for example, the size parameter is changed so as to narrow the range of the recognition size to the extent that the characters recognized in the process of step S14 can be recognized.

Figure 12:
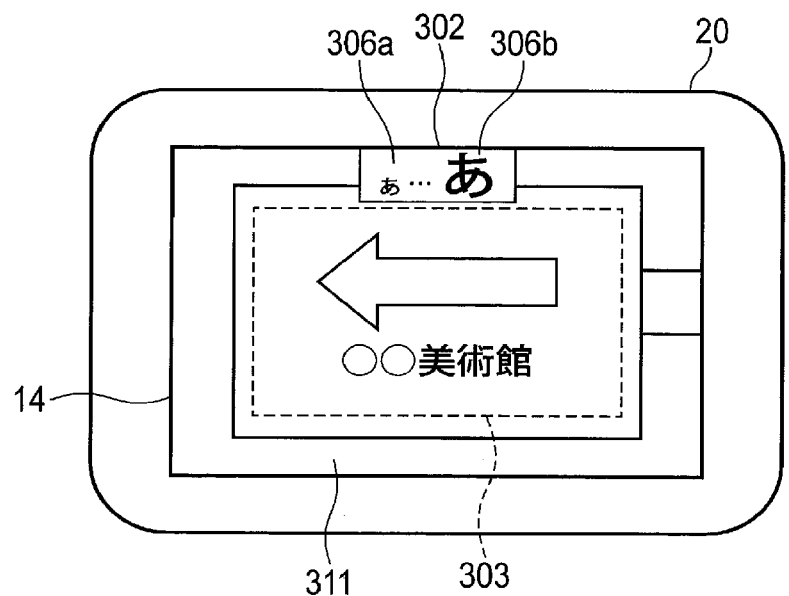
FIG. 12 is shown for specifically explaining a second parameter change process.
Figure 13:
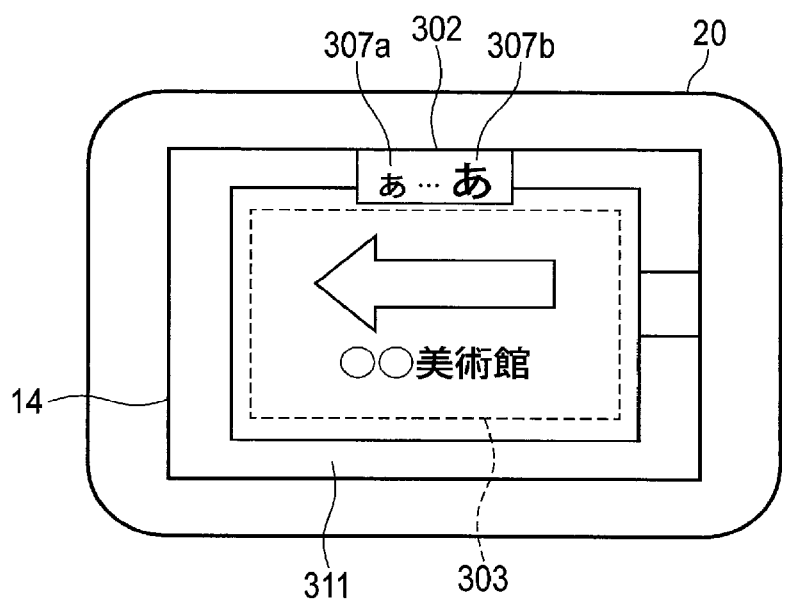
FIG. 13 is shown for specifically explaining the second parameter change process.

Specifically, as shown in, for example, FIG. 12, it is assumed that characters 306a and 306b are displayed in the size display area 302. In this structure, the characters in a wide range from the size of character 306a to the size of character 306b are recognizable. When the characters "○○ 美術館" shown in FIG. 12 are recognized, the range of the recognition size is narrowed to the extent that the characters "○○ 美術館" are recognizable as indicated by, for example, characters 307a and 307b displayed in the size display area 302 shown in FIG. 13. In this way, in comparison with the range of the recognition size shown in FIG. 12 (specifically, characters 306a and 306b), even when an unnecessary character other than the characters "○○ 美術館" is included in image 311, the unnecessary character is not recognized.

Whether or not the range of the recognition size is comparatively wide may be determined based on whether or not the range of the recognition size (the difference between the minimum and maximum values of the recognition size) is greater than a predetermined value, or may be determined based on whether or not the difference between the size of the characters recognized from the image and the recognition size (in other words, the minimum or maximum value of the recognition size) is greater than a predetermined value.

Similarly, in the second parameter change process, for example, when the recognition area defined in the area parameter is comparatively wide, the area parameter may be changed so as to reduce the size of the recognition area to the extent that the characters recognized in step S14 are included.

According to the second parameter change process, necessary characters can be recognized in the character recognition process. Further, the size of the characters to be recognized or the area in which characters is restricted and therefore the processing speed can be increased.

When no character is recognized in the character recognition process performed after the second parameter change process, the recognition size and recognition area changed by the second parameter change process may be returned to the state before the change. Alternatively, the range of the recognition size may be expanded, or the recognition area may be expanded.

Now, this specification explains the third parameter change process. In the present embodiment, this specification mainly explains a case where a still image captured by the camera 11 is displayed on a display 14. However, the character recognition device 20 may be configured to display a moving image captured by the camera 11 on the display 14 in real time and recognize the characters included in the moving image (the images constituting the moving image). In this structure, the display 14 displays a moving image in real time in accordance with the direction of the camera 11 adjusted by the user holding the character recognition device 20 (for example, a smartphone).

The third parameter change process is performed when the direction of the camera 11 is adjusted (changed) by the user while a moving image is displayed. Specifically, when the direction of the camera 11 is adjusted by the user while a moving image is displayed, the parameter changing module 211 determines that there is a need to change a parameter in step S15 and the third parameter change process is performed in step S16.

As shown in FIG. 14, it is assumed that an image 321 captured by the camera 11 (specifically, a moving image including a plurality of images including image 321) is displayed on the display 14. The size display area 302 in which characters 308a and 308b are displayed is provided on image 321. It is assumed that the user adjusts the direction of the camera 11 to the left. In this case, it is presumed that the user intends to cause the device to recognize the characters present on the left side when they are seen from the camera 11. In the third parameter change process, as shown in FIG. 15, when the direction of the camera 11 shown in FIG. 14 is adjusted to the left, the area parameter is changed such that the recognition area 303 defined in the area parameter is moved to the left.

According to the third parameter change process, for example, the characters "○○ 美術館" can be included in the recognition area 303 without changing the direction of the camera 11 to the extent that the characters are displayed near the center of the image. Thus, the amount of adjustment of the direction of the camera 11 necessary to recognize the characters can be reduced. In the above description, this specification explains a case where the direction of the camera 11 is adjusted to the left. However, the above explanation is also applicable to a case where the direction of the camera 11 is adjusted in another direction.

The direction of the camera 11 (in other words, the direction of adjustment of the camera 11) can be determined (detected) by an acceleration sensor, etc., provided in the character recognition device 20 (for example, a smartphone).

In the third parameter change process, for example, the position of the recognition area can be controlled (determined) based on the result of detection of a detection unit which is provided in the parameter changing module 211 to detect information (for example, the direction of the camera 11) related to the movement of the character recognition device 20 (self-device). The detection unit may be included in a component other than the parameter changing module 211. The character recognition device 20 may include a sensor such as an acceleration sensor.

In the above description, the recognition area is moved in the direction in which the direction of the camera 11 is adjusted (in other words, the position of the recognition area is changed in the direction). However, the range of the recognition area may be expanded in the direction.

It is assumed that, when a moving image is captured as described above, the user of the character recognition device 20 is able to perform an operation for zooming in on or out of an object (a notice, etc.,) included in the moving image.

When the user performs an operation for zooming in on an object, for example, the characters written in a notice, etc., included in a moving image are presumably smaller than the recognition size. In this case, the size parameter is changed such that the minimum value of the recognition size defined in the size parameter is decreased. In this way, the amount of zooming in on an object (character) necessary for the recognition of characters can be reduced.

When the user performs an operation for zooming out of an object, for example, the characters written in a notice, etc., included in a moving image are presumably larger than the recognition size. In this case, the size parameter is changed such that the maximum value of the recognition size defined in the size parameter is increased. In this way, the amount of zooming out of an object (character) necessary for the recognition of characters can be reduced. When the user zooms out of an object, the area parameter may be changed such that the recognition area defined in the area parameter is enlarged.

As described above, in the present embodiment, information related to the change in the recognition size may be determined based on one of a process for displaying an enlarged image and a process for displaying a reduced image.

In the above description, this specification explains a case where an object included in a moving image is zoomed in or out. However, the parameters may be changed as described above when the camera 11 is moved closer to an object or away from an object. The movement of the camera 11 in a direction toward an object or the movement of the camera 11 in a direction from an object may be determined by the acceleration sensor, etc., described above.

The parameter change processes explained above are merely examples. The parameters may be changed by performing another process.

As described above, in the present embodiment, when an image does not include a character having a size applicable to the range of the recognition size defined in the size parameter (a first parameter) from the minimum value (a first size) to the maximum value (a second size), the size parameter is changed so as to expand (enlarge) the range. In the present embodiment, by such a configuration, when no character is recognized from an image, the range in which characters are recognized from the image is enlarged. In this way, the desired characters for the user can be recognized without a requirement from the user to manually change the parameters.

In the present embodiment, when an image is (specifically, the characters included in an image are) zoomed in, the recognition size (specifically, the minimum value of the recognition size) is decreased. When an image is (specifically, the characters included in an image are) zoomed out, the recognition size (specifically, the maximum value of the recognition size) is increased. In this way, it is possible to save the trouble of the user in terms of an operation in which an image is zoomed in or out to cause the character recognition device 20 to recognize characters. Thus, the user-friendliness can be improved.

Further, in the present embodiment, when the direction of the camera 11 is adjusted by the user while the moving image captured by the camera 11 is displayed in real time, for example, the position of the recognition area defined in the area parameter is changed in the direction in which the direction of the camera 11 is adjusted. In the present embodiment, this structure allows the user to save the trouble of an operation for adjusting the direction of the camera 11 to cause the character recognition device 20 to recognize characters. Thus, the user-friendliness can be improved. In this case, even when the recognition area defined in the area parameter is enlarged in the direction in which the direction of the camera 11 is adjusted, the user-friendliness can be similarly improved.

In the present embodiment, this specification explains that the parameters (specifically, the size parameter and the area parameter) set in the configuration file are changed mainly based on the result of character recognition process. However, for example, the parameters may be changed before the execution of a character recognition process.

Specifically, in general, in many cases, complicated characters such as Chinese characters need to be displayed with a large size for a character recognition process in comparison with alphabetical letters. Thus, for example, when characters including a Chinese character are recognized in a character recognition process, the size parameter may be changed such that the maximum value of the recognition size defined in the size parameter is great. When an alphabetical letter is recognized in a character recognition process, the size parameter may be changed such that the minimum value of the recognition size defined in the size parameter is less. The language of the characters recognized in a character recognition process can be determined by the operation mode, etc., of the character recognition device 20.

According to at least one of the above embodiments, it is possible to provide an information processing device allowing the user to easily confirm the target to be recognized from an image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A target recognition device, comprising:
 a storage device configured to store a minimum value and a maximum value of a size of a target capable of being recognized from images; and
 a processor connected to the storage device, wherein the processor is configured to:
  display an image including a first object having a size corresponding to the minimum value stored in the storage device and a second object having a size corresponding to the maximum value stored in the storage device; and recognize a target, having a size falling within a range from the minimum value to the maximum value, from the image;

change said range to a changed range by an operation of a user; and recognize the target having a size falling within the changed range, from the image.

2. The target recognition device of claim 1, wherein each of the target, the first object, and the second object includes a character.

3. The target recognition device of claim 1, wherein the first object and the second object are determined in accordance with an operation mode for recognizing the target.

4. The target recognition device of claim 1, wherein the processor is further configured to, when a target having a size falling within the range is not included in the image, enlarge the range.

5. The target recognition device of claim 1, wherein the first object and the second object are determined based on one of a process for displaying an enlarged image and a process for displaying a reduced image.

6. The target recognition device of claim 1, wherein the processor is further configured to:

perform a process for displaying a recognition area in the image, and recognize the target from the recognition area.

7. The target recognition device of claim 6, wherein the processor is further configured to perform a process for enlarging the area when no target is included in the recognition area.

8. The target recognition device of claim 6, wherein the processor is further configured to:

detect movement of a self-device, and control a position of the recognition area in the image based on the movement.

9. The target recognition device of claim 1, further comprising a display that displays the image, the first object, and the second object.

10. The target recognition device of claim 1, wherein at least one of the minimum value and the maximum value is changed by the operation of the user before the target is recognized from the image.

11. The target recognition device of claim 1, wherein the minimum value and the maximum value are parameters that set a minimum size and a maximum size, respectively, of the target that can be recognized from the image.

12. The target recognition device of claim 11, wherein at least one of the minimum value and the maximum value is changed by the operation of the user before the target is recognized from the image.

* * * * *